US012577083B2

(12) United States Patent

Martí Sánchez et al.

(10) Patent No.: US 12,577,083 B2

(45) Date of Patent: Mar. 17, 2026

(54) ELEVATOR SAFETY DEVICE AND METHOD OF ACTIVATING AN ELEVATOR SAFETY DEVICE

(71) Applicant: OTIS ELEVATOR COMPANY, Farmington, CT (US)

(72) Inventors: Luis Martí Sánchez, Madrid (ES); Manuel García Canales, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 10 days.

(21) Appl. No.: 18/959,899

(22) Filed: Nov. 26, 2024

(65) Prior Publication Data

US 2025/0206570 A1 Jun. 26, 2025

(30) Foreign Application Priority Data

Dec. 21, 2023 (EP) .................................... 23383341

(51) Int. Cl.

*B66B 5/22* (2006.01)
*B66B 5/18* (2006.01)
*B66B 5/20* (2006.01)

(52) U.S. Cl.

CPC .................. *B66B 5/22* (2013.01); *B66B 5/18* (2013.01); *B66B 5/20* (2013.01)

(58) Field of Classification Search

CPC .. B66B 5/18; B66B 5/185; B66B 5/20; B66B 5/22; B66B 5/24; B66B 5/26

See application file for complete search history.

(56) References Cited

U.S. PATENT DOCUMENTS 623,080 A * 4/1899 Ellingwood .............. B66B 5/24 187/375
4,538,706 A * 9/1985 Koppensteiner .......... B66B 5/22 188/41
6,176,350 B1 * 1/2001 Schlosser .................. B66B 5/20 188/41

(Continued)

*Primary Examiner* — Minh Truong

(74) *Attorney, Agent, or Firm* — Carlson, Gaskey & Olds, P.C.

(57) ABSTRACT

An elevator safety device comprises a housing attachable to an elevator car or to an elevator counterweight of an elevator system, the housing comprising a passage for allowing a guide member to pass through. A brake shoe is attached to the housing and is located on a first side of the guide member. A support element is arranged on a second of side of the guide member, the support element extending at an angle with respect to the guide member, thereby defining a tapered region between the guide member and the support element. A movable braking element is rotatable around a rotation axis of the movable braking element. The movable braking element is, at least in an activated condition of the elevator safety device, arranged within the tapered region defined by the support element and the guide member. The movable braking element is capable of rotatingly moving along the support element into a wedged condition between the support element and the guide member. The movable braking element has, in a plane that is oriented perpendicularly to the rotation axis, a non-circular cross-section, which is defined by a closed curve having a constant width.

21 Claims, 8 Drawing Sheets

(56) References Cited

U.S. PATENT DOCUMENTS

| | | | | |
|---|---|---|---|---|
| 8,312,972 | B2 * | 11/2012 | Gremaud | B66B 5/22<br>187/371 |
| 10,640,331 | B2 | 5/2020 | Kakio et al. | |
| 2015/0298937 | A1 | 10/2015 | Rieser et al. | |
| 2018/0282124 | A1 | 10/2018 | Watson et al. | |

* cited by examiner

ELEVATOR SAFETY DEVICE AND METHOD OF ACTIVATING AN ELEVATOR SAFETY DEVICE

CROSS-REFERENCE TO RELATED APPLICATION

This application is a U.S. non-provisional application claiming the benefit of European Application No. 23383341.7, filed on Dec. 21, 2023, which is incorporated herein by reference in its entirety.

TECHNICAL FIELD

The disclosure relates to an elevator safety device. The disclosure further relates to an elevator car, to an elevator counterweight and to an elevator system respectively comprising an elevator safety device, and to a method of activating an elevator safety device.

BACKGROUND

An elevator system typically comprises at least one elevator car, which is configured for moving along a hoistway extending between a plurality of landings, and a driving member, which is configured for driving the elevator car. The elevator system may further include an elevator counterweight moving concurrently and in opposite direction with respect to the elevator car. An elevator system usually comprises at least one elevator safety device that is configured for braking the movement of the elevator car and/or the elevator counterweight relative to a guide member, such as a guide rail, in certain situations, for example when the movement of the elevator car and/or of the elevator counterweight exceeds a predetermined speed and/or acceleration. An elevator safety device usually includes at least one engagement member that is configured for engaging with the guide member for braking the movement of the elevator safety device along the guide member, when the elevator safety device is activated.

Currently available elevator safety devices have a relatively large size and/or are limited in their braking capacities.

SUMMARY

An improved elevator safety device is provided, which may have smaller dimensions and/or which provides an enhanced braking capacity.

According to an exemplary embodiment of the disclosure, an elevator safety device comprises a housing configured for being attached to an elevator car or to a counterweight of an elevator system. The housing comprises a passage for allowing a guide member of the elevator system to pass through. The elevator safety device further comprises a brake shoe, which is attached to the housing and located on a first side of the guide member passing through the passage; a support element arranged on a second of side of the guide member passing through the passage, the support element extending at an angle with respect to the guide member, defining a tapered region between the guide member and the support element; and a movable braking element, which is rotatable around a rotation axis of the movable braking element. At least in an activated condition of the elevator safety device, the movable braking element is arranged within the tapered region, which is defined by the support element and the guide member. The movable braking element is capable of moving along the support element, while rotating around its rotation axis, into a wedged condition between the support element and the guide member. The movable braking element has a non-circular cross-section, which is defined by a closed curve having a constant width.

Exemplary embodiments of the disclosure also include a method of activating an elevator safety device according to an exemplary embodiment of the disclosure, wherein the method includes moving the movable braking element into a position, in which it is in contact with the guide member, resulting in frictional engagement between the movable braking element and the guide member, so that the movable braking element is moved, due to the frictional engagement with the guide member, into a wedged condition between the support element and the guide member, when the elevator safety device moves along the guide member.

A movable braking element of an elevator safety device according to an exemplary embodiment of the disclosure, having a non-circular cross-section, which is defined by a closed curve having a constant width, allows reducing the dimensions, in particular the diameter, of the movable braking element without increasing a curvature of those sections of the outer periphery of the movable braking element that are in contact with the support element and/or with the guide member, when the elevator safety device is in the activated condition. The curvature of the sections of the outer periphery of the movable braking element, which are in contact with the support element and/or with the guide member, is a crucial factor for defining the maximum braking capacity of the elevator device and also the impact of a braking operation on the guide rails. Generally, a movable braking element having a smaller curvature of the sections of the outer periphery of the movable braking element, which are in contact with the support element and/or with the guide member, will have improved braking capacity and cause less damage to the guide rail when being activated, compared to a movable braking element having a larger curvature. For example, in case a section of the outer periphery of the movable braking element, which is in contact with the support element and/or with the guide member, has a shape of a circular arc section, its curvature can be defined by a radius of the circular arc section, and the larger the radius of the circular arc section is, the smaller is its curvature. A movable braking element according to an exemplary embodiment of the disclosure therefore allows for reducing the dimensions of the movable braking element, while avoiding a corresponding increase in the curvature of its outer periphery. In consequence, the dimensions of the elevator safety device can be decreased without reducing the maximum braking capacity and/or enhancing the impact on the guide rails of the elevator device after activation.

Similarly, a movable braking element of an elevator safety device according to an exemplary embodiment of the disclosure allows for improving the braking capabilities of the elevator safety device without increasing the dimensions of the movable braking element and of the elevator safety device.

A movable braking element of an elevator safety device according to an exemplary embodiment of the disclosure further allows for reducing potential damage of a guide member of the elevator system, which may be caused by the engagement of the movable braking element with the guide member.

Exemplary embodiments of the disclosure further include an elevator car comprising at least one elevator safety device according to an exemplary embodiment of the disclosure.

Exemplary embodiments of the disclosure also include an elevator counterweight comprising at least one elevator safety device according to an exemplary embodiment of the disclosure.

Exemplary embodiments of the disclosure further include an elevator system comprising an elevator car, which is movable along a guide member between a plurality of landings, and which comprises at least one elevator safety device according to an exemplary embodiment of the disclosure.

Exemplary embodiments of the disclosure also include an elevator system comprising an elevator counterweight, which is movable along a guide member between a plurality of landings, and which comprises at least one elevator safety device according to an exemplary embodiment of the disclosure.

A number of optional features of exemplary embodiments of the disclosure are set out in the following. These features may be realized in particular embodiments, alone or in combination with any of the other features, unless explicitly stated otherwise.

When the movable braking element, in frictional engagement between the movable braking element and the guide member, rotates around its rotation axis, the rotation axis of the movable braking element may move along the circumference of a circle. While the movable braking element rotatingly moves along the support element, the movable braking element stays in contact with the support element, which is arranged on one side of the movable braking element. The movable braking element also stays in contact with the guide rail, which is arranged on the opposite side of the movable braking element. In the course of said motion, the non-circular cross-section of the movable braking element causes the rotation axis of the movable braking element to move along the circumference of a circle, when viewed in a local coordinate system, which moves linearly along the support element together with the movable braking element.

Particularly, the non-circular cross-section may comprise a plurality of circular arc shaped sections. Each of said circular arc shaped sections has a curvature defined by a circular arc having a radius. Each of said circular arc shaped sections has a same radius.

The cross-section of the movable braking element may have the shape of a Reuleaux polygon, in particular the shape of a Reuleaux triangle or the shape of a Reuleaux pentagon. Reuleaux polygons are examples of non-circular geometric shapes having a constant width, which may be used for designing a movable braking element according to an exemplary embodiment of the disclosure.

Although, according to a strict mathematical definition, Reuleaux polygons have sharp corners, it is understood that in the context of the present disclosure, a movable braking element having a constant width, which has basically the shape of a Reuleaux polygon, in particular the curved edges of a Reuleaux polygon, but smoothly rounded corners, is also considered as having the shape of a Reuleaux polygon.

In order to provide a movable braking element having a constant width according to an exemplary embodiment of the disclosure, wherein the movable braking element has basically the shape of a Reuleaux polygon with smoothly rounded corners, the circumferential periphery of the movable braking element may comprise a plurality of circular arc shaped sections having at least two different curvatures. Each of said circular arc shaped sections has a curvature defined by a circular arc having a radius. Each of said circular arc shaped sections has one of a first radius and a second radius. The circumferential periphery of the movable braking element may, for example, comprise six circular arc shaped sections. Each of said six circular arc shaped sections has one of a first radius and a second radius arranged alternately along the circumferential periphery of the movable braking element.

The circumferential periphery of the movable braking element may in particular comprise a first group of circular arc shaped sections having a first curvature as defined by a first radius, and a second group of circular arc shaped sections having a second curvature as defined by a second radius, which differs from the first radius. The circular arc shaped sections of the first group and the circular arc shaped sections of the second group may be arranged alternately along the circumferential periphery of the movable braking element. The circular arc shaped sections of the first group may in particular have a first length along the circumferential periphery of the movable braking element, and the circular arc shaped sections of the second group may in particular have a second length along the circumferential periphery of the movable braking element, which differs from the first length. The second length may be substantially shorter than the first length.

The circular arc shaped sections of the first group may, in particular, be defined by the curved edges of a first Reuleaux polygon, and the circular arc shaped sections of the second group may, in particular, be defined by the curved edges of a second Reuleaux polygon.

Forming the circumferential periphery of a movable braking element from a first group of circular arc shaped sections having a first curvature as defined by a first radius, and a second group of circular arc shaped sections having a second curvature as defined by a second radius, which differs from the first radius, provides a suitable way of designing a movable braking element according to an exemplary embodiment of the disclosure, which may be adjusted easily to individual needs.

The support element may be a support bar extending in a longitudinal direction between two opposing ends.

The support element may be stiff or at least partially elastic. The support element may in particular be at least partially elastic in a direction, which is oriented perpendicularly to the longitudinal direction of the support element and the rotation axis of the movable braking element. A support element, which is at least partially elastic, may exert an elastic force onto the movable braking element, when the elevator safety device is in its activated condition. Exerting an elastic force onto the movable braking element may enhance the maximum braking capacity provided by the elevator safety device.

In order to provide a support, which is at least partially elastic, the support element may comprise a spring assembly. The spring assembly may in particular comprise a leaf spring or a stack, which is formed of a plurality of leaf springs.

In an alternative embodiment, the elevator safety device may comprise one or more compression springs pressing against a stiff plate.

In a further embodiment, the support element may have a stiff surface on the side facing the roller and a spring assembly on the opposite side.

The elevator safety device may comprise at least one stopper, which is configured for stopping the movement of the movable braking element along the support element. The stopper may further be configured for stopping any rotation of the movable braking element. The stopper may in particular be configured for stopping any further movement and/or rotation of the movable braking element when the movable braking element has reached an end of the support element, in order to prevent the movable braking element from moving beyond the end of the support element.

The at least one stopper may be provided by a portion of the housing. The at least one stopper may also be formed integrally with a portion of the housing.

An elevator car and/or an elevator counterweight according to an exemplary embodiment of the disclosure may include a first elevator safety device according to an exemplary embodiment of the disclosure and a second elevator safety device according to an exemplary embodiment of the disclosure.

In the first elevator safety device, a first end of the support element may be a lower end of the support element facing towards the floor of the hoistway, and a second end of the support element, which is arranged closer to the guide rail than the first end, may be an upper end of the support element facing towards an upper end of the hoistway.

In the second elevator safety device, the first end of the support element may be an upper end of the support element facing towards an upper end of the hoistway, and the second end of the support element, which is arranged closer to the guide rail than the first end, may be a lower end of the support element facing towards the floor of the hoistway.

Such a combination of the first and second elevator safety devices allows for braking the movement of the elevator car or of the elevator counterweight in both moving directions, i.e. an upward movement and a downward movement, along the guide member.

BRIEF DESCRIPTION OF THE DRAWINGS

In the following, exemplary embodiments of the disclosure are described in more detail with respect to the enclosed figures.

DETAILED DESCRIPTION

Figure 1:
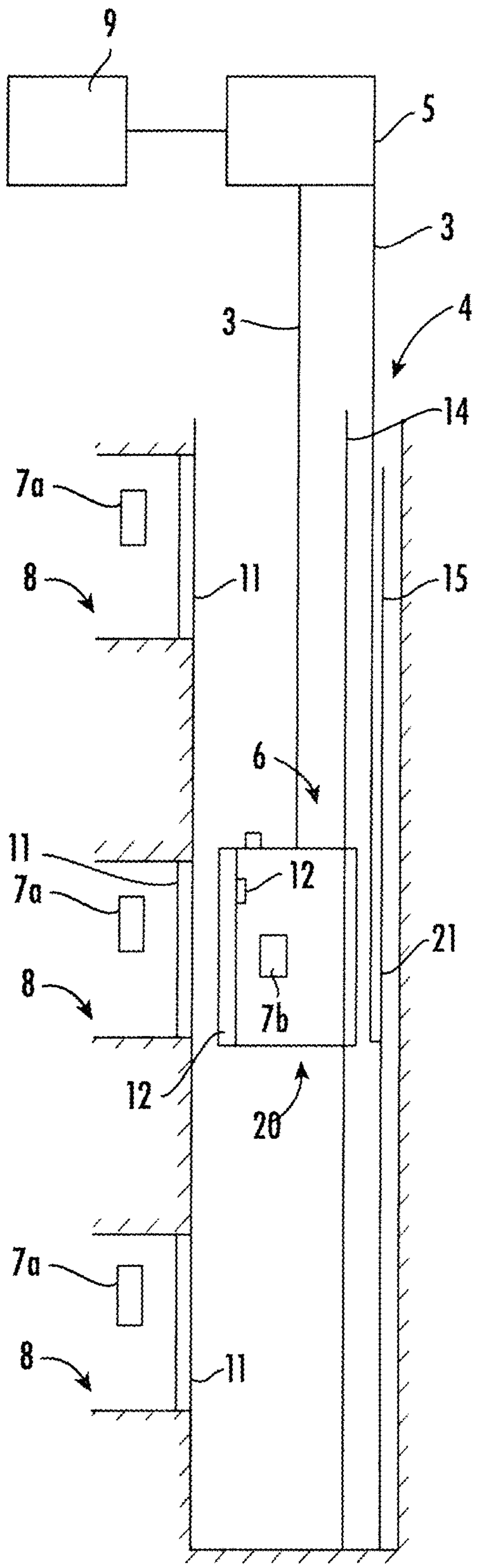
FIG. 1 schematically depicts an elevator system according to an exemplary embodiment of the disclosure.

FIG. 1 schematically depicts an elevator system 2 according to an exemplary embodiment of the disclosure.

The elevator system 2 comprises a hoistway 4 extending in a vertical direction between a plurality of landings 8, which are located on different floors. The elevator system 2 includes an elevator car 6, which is arranged within the hoistway 4 for being moved between the plurality of landings 8. The elevator car 6 is movable in particular along a plurality of car guide members 14, such as guide rails, extending along the vertical direction of the hoistway 4. Only one of said car guide members 14 is visible in FIG. 1. Although only a single elevator car 6 is depicted in FIG. 1, exemplary embodiments of the disclosure may include elevator systems 2 comprising a plurality of elevator cars 6 moving in one or more hoistways 4.

The elevator car 6 is movably suspended by way of a tension member 3. The tension member 3 is coupled to an elevator drive 5, which is configured for driving the tension member 3 in order to move the elevator car 6 along the height of the hoistway 4 between the plurality of landings 8. The elevator drive 5 is controlled by an elevator system controller 9.

The tension member 3 may be a rope, e.g. a steel cord, or a belt. The tension member 3 may be uncoated. Alternatively, the tension member 3 may be coated with a coating, e.g. with a coating having the form of a polymer jacket. In a particular embodiment, the tension member 3 may be a belt comprising a plurality polymer coated steel cords (not shown). The elevator system 2 may have a traction drive including a traction sheave for driving the tension member 3.

The exemplary embodiment shown in FIG. 1 uses a 1:1 roping for suspending the elevator car 6. The skilled person, however, easily understands that the type of the roping is not essential for the disclosure and that different kinds of roping, e.g. a 2:1 roping or a 4:1 roping may be used as well.

The elevator system 2 depicted in FIG. 1 also includes an elevator counterweight 21. The elevator counterweight 21 is attached to the tension member 3 opposite to the elevator car 6 and configured to move along at least one counterweight guide member 15. The disclosure may be applied similarly to elevator systems 2 which do not comprise an elevator counterweight 21.

In an alternative configuration, which is not shown in the figures, the elevator system 2 may be an elevator system 2 without a tension member 3. Instead, the elevator system 2 may include, for example, a hydraulic drive or a linear drive. The elevator system 2 may have a machine room, which is not shown in FIG. 1, or it may be a machine room-less elevator system.

Each landing 8 is provided with a landing door 11, and the elevator car 6 is provided with a corresponding elevator car door 12 for allowing passengers to transfer between a landing 8 and the interior of the elevator car 6, when the elevator car 6 is positioned at the respective landing 8.

Input to the elevator system controller 9 may be provided via landing control panels 7*a*, which are provided on every landing 8, in particular in the vicinity of the landing doors 11, and/or via an elevator car control panel 7*b*, which is provided inside the elevator car 6.

The landing control panels 7*a* may comprise elevator hall call buttons and/or destination call buttons. Destination call buttons allow passengers to enter their respective destinations before entering the elevator car 6. In case the landing control panels 7*a* are equipped with elevator hall call buttons, no elevator car control panel 7*b* needs to be provided inside the elevator car 6, since the elevator system 2 is fully controlled by the commands input via the landing control panels 7*a*.

The landing control panels 7*a* and the elevator car control panel 7*b* may be connected to the elevator system controller

9 with electrical wiring, which is not shown in FIG. 1, in particular by an electric bus (e.g. a CAN bus), or with wireless data connections.

The elevator car 6 is equipped with at least one elevator safety device 20, which is schematically illustrated at the elevator car 6 in FIG. 1.

The elevator safety device 20 is operable to brake or at least assist in braking, i.e. slowing or stopping the movement of, the elevator car 6 by engaging with the at least one car guide member 14.

Alternatively or additionally, the elevator counterweight 21 may be equipped with at least one elevator safety device 20, which is configured for engaging with the at least one counterweight guide member 15. For sake of simplicity of the illustration, the elevator counterweight 21 depicted in FIG. 1 is not equipped with an elevator safety device 20.

Figure 2:
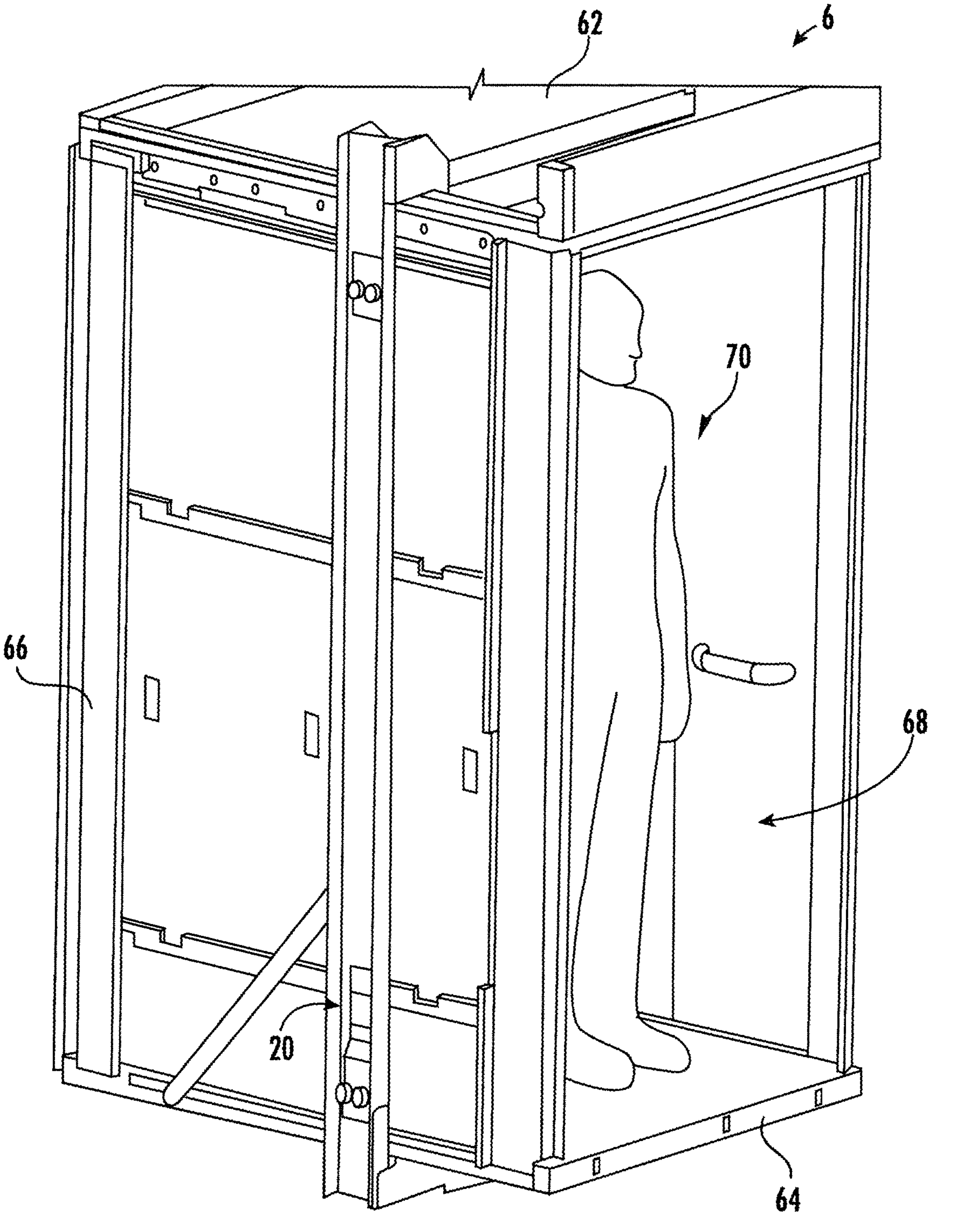
FIG. 2 shows a perspective view of an elevator car according to an exemplary embodiment of the disclosure.

FIG. 2 is an enlarged view of an elevator car 6 according to an exemplary embodiment of the disclosure. The elevator car 6 includes a car roof 62, a car floor 64 and a plurality of car side walls 66. In combination, the car roof 62, the car floor 64 and the plurality of side walls 66 define an interior space 68 of the elevator car 6 for accommodating and carrying passengers 70 and/or cargo. For sake of simplicity of the illustration, cargo is not shown in FIG. 2.

An elevator safety device 20 according to an exemplary embodiment of the disclosure is attached to a side wall 66 of the elevator car 6.

Although only a single elevator safety device 20 is depicted in FIGS. 1 and 2, respectively, the skilled person will understand that a single elevator car 6 and a single elevator counterweight 21 may be equipped with a plurality of safety devices 20, respectively.

In particular, in a configuration, in which the elevator system 2 comprises a plurality of car guide members 14, each elevator car 6 may be equipped with a plurality of elevator safety devices 20. Each of the plurality of elevator safety devices 20 may be associated with one of the car guide members 14, respectively.

Similarly, in a configuration, in which the elevator system 2 comprises a plurality of counterweight guide members 15, each elevator counterweight 21 of the elevator system 2 may be equipped with a plurality of elevator safety devices 20. Each elevator safety device 20 may be associated with one of the counterweight guide members 15, respectively.

Alternatively or additionally, two or more elevator safety devices 20 may be provided on top of each other at the same sidewall 66 of the elevator car 6 or of the elevator counterweight 21 in order to engage with the same guide member 14, 15.

A safety device 20 is usually operable for braking its movement with respect to the guide member 14, 15 in only one direction. The elevator car 6 and/or the elevator counterweight 21 may therefore be equipped with at least two elevator safety devices 20, which are configured for braking the movement with respect to the guide member 14, 15 in opposite directions.

The at least two elevator safety devices 20 may in particular include a first elevator safety device 20, which is configured for braking a downward movement of the elevator car 6/elevator counterweight 21 with respect to the guide member 14, 15; and a second elevator safety device 20, which is configured for braking an upward movement of the elevator car 6/elevator counterweight 21 with respect to the guide member 14, 15.

In the following, the structure and the operating principles of an elevator safety device 20 according to an exemplary embodiment of the disclosure will be described.

Figure 3A:
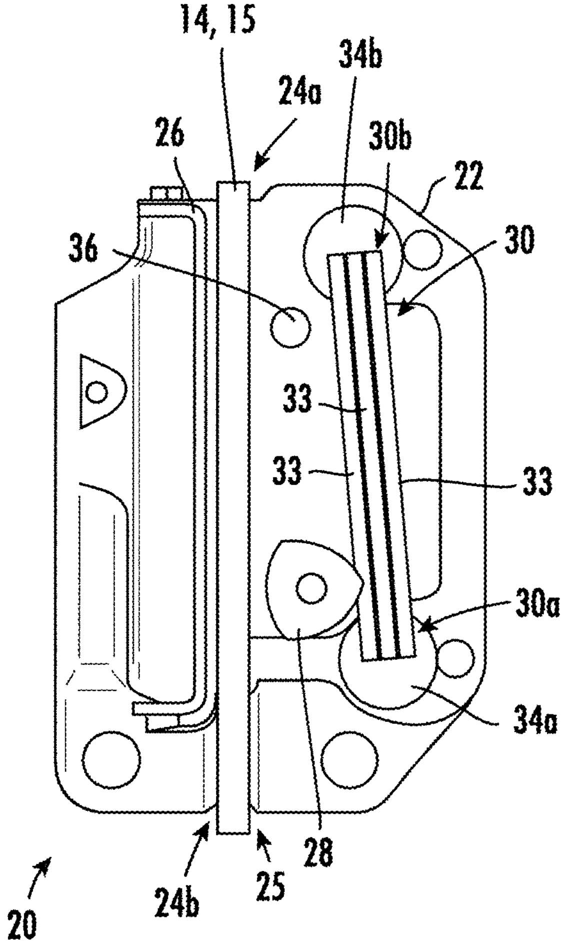
FIG. 3A depicts a schematic plan view of an elevator safety device according to an exemplary embodiment of the disclosure in a deactivated standby state.

FIG. 3A depicts a schematic plan view of an elevator safety device 20 according to an exemplary embodiment of the disclosure in a deactivated standby state.

Figure 3B:
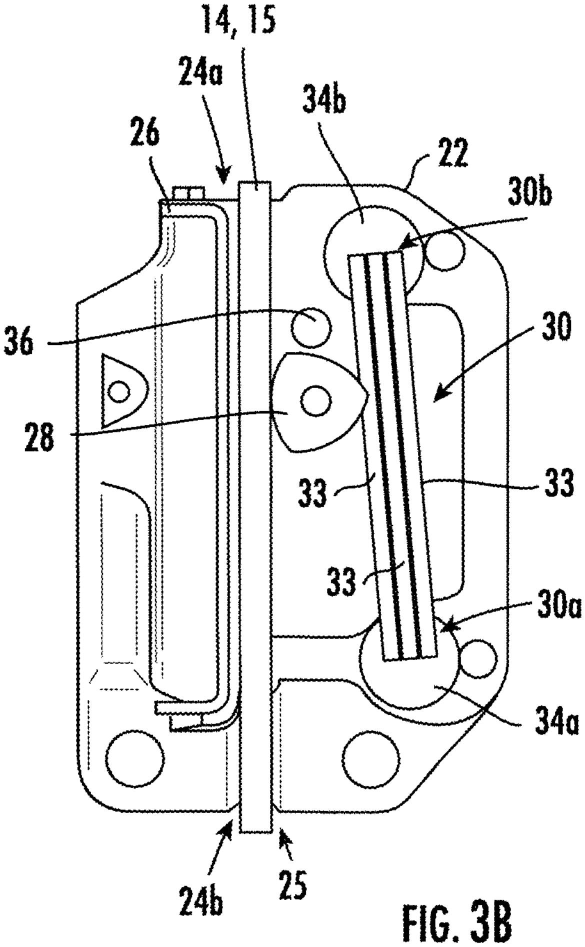
FIG. 3B depicts the elevator safety device depicted in FIG. 3A in an activated state.

FIG. 3B depicts the elevator safety device 20 depicted in FIG. 3A in an activated state.

The elevator safety device 20 depicted in FIGS. 3A and 3B comprises a housing 22. When the elevator safety device 20 is installed within an elevator system 2, the housing 22 is closed, e.g. by a cover plate, which is not shown in the figures. In FIGS. 3A and 3B, the housing 22 is depicted in an open state without the cover plate, in order to allow showing the internal structure of the elevator safety device 20.

A first opening 24*a* is formed in atop portion of the housing 22, and a second opening 24*b* is formed in a bottom portion of the housing 22. The two openings 24*a*, 24*b* provide a passage 25 extending through the elevator safety device 20 and allowing an elevator guide member 14, 15 to pass through the elevator safety device 20.

The elevator safety device 20 comprises two engagement members, in particular a brake shoe 26 acting as a first engagement member, and a movable braking element 28 acting as a second engagement member.

The first and second engagement members are arranged opposite to each other with a gap formed in between. The gap is part of the passage 25 extending through the elevator safety device 20, and it is configured for accommodating a portion of a guide member 14, 15 of the elevator system 2 extending in a longitudinal direction, in particular in a vertical direction.

The brake shoe 26 is supported by the housing 22 on a first side, which is the left side in the orientation of the elevator safety device 20 depicted in FIGS. 3A and 3B, of the elevator guide member 14, 15 passing through the elevator safety device 20.

The movable braking element 28 is arranged on a second side, which is the right side in the orientation of the elevator safety device 20 depicted in FIGS. 3A and 3B, of the guide member 14, 15 passing through the elevator safety device 20. In consequence, the guide member 14, 15 extends between the brake shoe 26 and movable braking element 28 through the elevator safety device 20.

The elevator safety device 20 further comprises a support element 30, in particular a support bar, which is also arranged on the second of side of the guide member 14, 15.

The support element 30 has two opposing ends 30*a*, 30*b*, which are fixed to the housing 22. The elevator safety device 20 may in particular include a first fixture 34*a*, which is configured for fixing a first end 30*a* of the support element 30 to the housing 22, and a second fixture 34*b*, which is configured for fixing a second end 30*b* of the support element 30 to the housing 22.

The first and second fixtures 34*a*, 34*b* may be mounted to the housing 22. Alternatively, the fixtures 34*a*, 34*b* may be formed integrally with the housing 22.

The support element 30 may be fixed within the fixture 34 by fixing elements, which are not shown in FIGS. 3A and 3B. Such fixing elements may include screws or bolts, extending through the support element 30. The support element 30 may also be fixed to the fixture 34 by clamping, soldering, welding or adhesive bonding.

A central portion of the support element 30, which is located between the two opposing ends 30*a*, 30*b* may be movable with respect to the housing 22.

The support element 30 may in particular comprise at least one leaf spring 33, which is fixed to the housing 22 at the two opposing ends 30*a*, 30*b*, with the central portion of the at least one leaf spring 33. The support element 30 may in particular comprise a plurality of leaf springs 33 that are arranged in a sandwich structure on top of each other forming a stack of leaf springs 33.

The support element 30 extends at an angle with respect to the guide member 14, 15, so that the second end 30*b* of the support element 30 is arranged closer to the guide member 14, 15 than the first end 30*a* of the support element 30. As a result, a tapered region is defined between the guide member 14, 15 and the support element 30.

The support element 30 may in particular be arranged at an angle in the range of between 3° and 15° with respect to the guide member 14, 15.

The movable braking element 28 is movably arranged within the tapered region defined by the guide member 14, 15 and the support element 30. The movable braking element 28 is in particular configured for rolling along the support element 30 and for simultaneously rolling along the longitudinal extension of the guide member 14, 15.

When the elevator safety device 20 is in a standby configuration, in which the elevator safety device 20 is not activated, as it is depicted in FIG. 3A, the movable braking element 28 is located in a standby position, in which it does not contact the guide member 14, 15. In the standby configuration, the elevator safety device 20 and, in consequence, an elevator car 6 or an elevator counterweight 21, to which the elevator safety device 20 is mounted, are capable to move freely along the guide member 14, 15.

The standby position of the movable braking element 28 may be located in the vicinity of the first end 30*a* of the support element 30, as it is depicted in FIG. 3A.

For activating the elevator safety device 20, the movable braking element 28 is moved by an activation mechanism, which is not depicted in the figures, towards the guide member 14, 15 into a position, in which the movable braking element 28 contacts the guide member 14, 15.

The movable braking element 28 contacting the guide member 14, 15 results in frictional engagement between the movable braking element 28 and the guide member 14, 15. As a result of said frictional engagement, a downward movement of the elevator safety device 20 with respect to the guide member 14, 15 causes the movable braking element 28 to unroll along the guide member 14, 15 on one side of the movable braking element 28 (the left side of the movable braking element 28 in FIGS. 3A and 3B) and to unroll upwards along the support element 30 on the other side of the movable braking element 28 (the right side of the movable braking element 28 in FIGS. 3A and 3B).

Due to the inclined orientation of the support element 30 with respect to the guide member 14, 15, the movement of the movable braking element 28 along the guide member 14, 15 and along the support element 30 causes the movable braking element 28 to move into a wedged condition, in which the movable braking element 28 is sandwiched between the guide member 14, 15 and the support element 30, as illustrated in FIG. 3B.

When the movable braking element 28 is in the wedged condition, in which it is sandwiched between the guide member 14, 15 and the support element 30, the movable braking element 28 is pressed against the guide member 14, 15. This generates braking forces between the guide member 14, 15 and the movable braking element 28 as well as between the guide member 14, 15 and the brake shoe 26 of the elevator safety device 20. Said braking forces may brake movement of the elevator safety device 20 with respect to the guide member 14, 15, until said movement has been stopped.

A knurling, which is intended to interact with the guide member 14, 15, may be formed on the circumferential periphery of the movable braking element 28.

Optionally, a groove may be formed within a surface of the support element 30 facing the guide member 14, 15, and a corresponding collar may be formed on the circumferential surface of the movable braking element. The collar formed on the movable braking element may be received within the groove, which is formed within the surface of the support element, in order to prevent the knurling from touching and interacting with the support element 30. The groove and the collar are not shown in FIGS. 3A and 3B.

The elevator safety device 20 may further comprise a stopper 36, which is located in the vicinity of the second end 30*b* of the support element 30. The stopper 36 is configured for preventing the movable braking element 28 from moving beyond the second end 30*b* of the support element 30. The stopper 36 may further be configured for preventing the movable braking element 28 from rotating.

The stopper 36 may be attached to the housing 22, and supported by the housing 22. The stopper 36 may also be formed integrally with the housing 22, e.g. as a portion of the housing 22.

Figure 9:
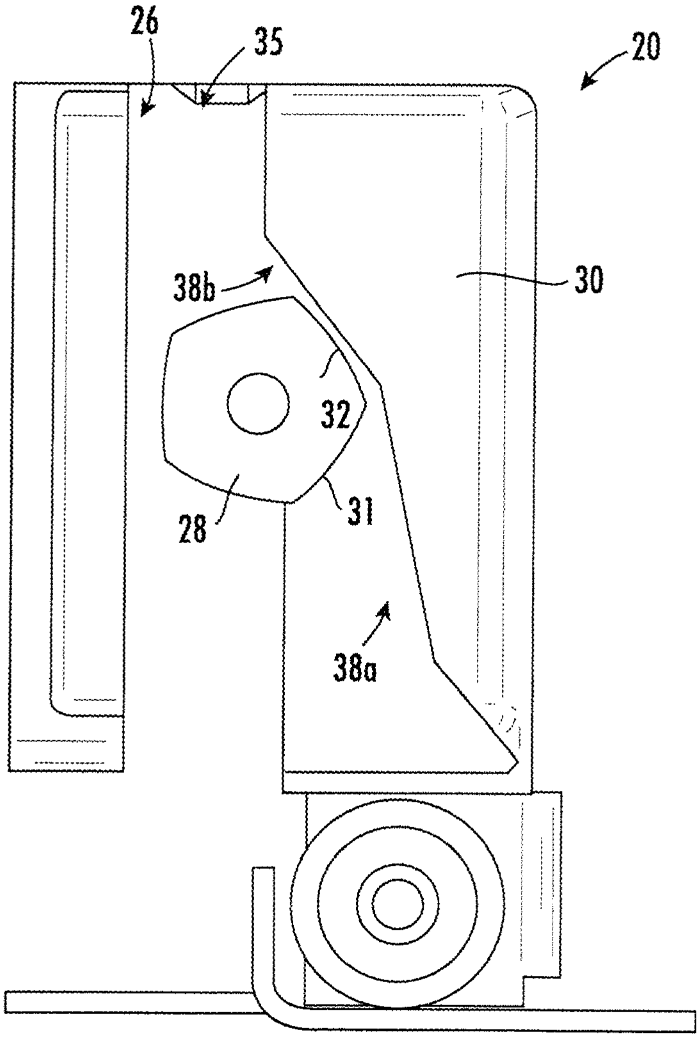
FIG. 9 depicts a schematic plan view of an elevator safety device according to further exemplary embodiment of the disclosure.

The safety device 20 may be configured such that the elevator car 6 or the elevator counterweight 21, to which the safety device 20 is mounted, has come to a complete stop, when or before the movement of the movable braking element 28 along the support element 30 is stopped by the stopper 36. Such safety devices 20 are known as “instantaneous safety devices” 20. An example of such an “instantaneous safety device” 20 is depicted in FIG. 9.

In so called “progressive safety devices” 20, the movable braking element 28 still moves along the guide member 14, 15, even after the movement of the movable braking element 28 along the support element 30 has been stopped by the stopper 36. When being stopped by the stopper 36, the movable braking element 28 becomes a static braking element 28, i.e. a braking element 28, which is stationary with respect to the elevator safety device 20, in particular with respect to the support element 30. Optionally, the stopper 36 may further prevent the braking element 28 from rotating.

After having been stopped by the stopper 36, the braking element 28 may slide along the guide member 14, 15 with or without rotating. Such a sliding movement of the braking element 28 results in a frictional force between the braking element 28 and the guide member 14, 15. Said frictional force finally stops any movement of the elevator safety device 20 with respect to the guide member 14, 15.

The elevator safety device 20 depicted in FIGS. 3A and 3B is configured for braking downward movement of the elevator safety device 20 with respect to the guide member 14, 15.

An elevator safety device 20, which is configured for braking upward movement of the elevator safety device 20 with respect to the guide member 14, 15, would be oriented in an upside down orientation with respect to the orientation depicted in FIGS. 3A and 3B, i.e. in an orientation, in which the first end 30*a* of the support element 30 is oriented towards the top and the second end 30*b* of the support element 30, which is closer to the guide member 14, 15 than the first end 30*a*, is oriented towards the bottom.

As depicted in FIGS. 3A and 3B, the movable braking element 28 has a non-circular shape in a cross section that is oriented parallel to the plane of projection of FIGS. 3A and 3B. The non-circular cross-section of the movable braking element 28 defines a geometric shape having a constant width.

Figure 4:
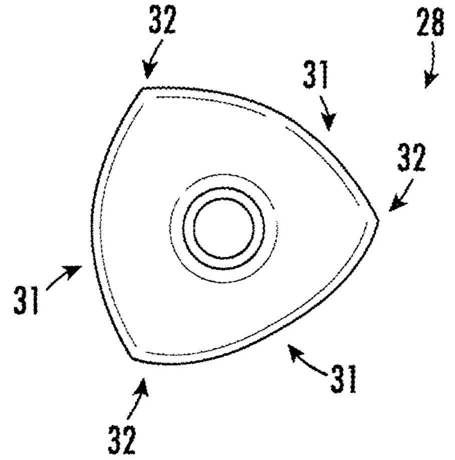
FIG. 4 depicts an enlarged view of the movable braking element, which is employed in the elevator safety device depicted in FIGS. 3A and 3B.

An enlarged view of the movable braking element 28 employed in the elevator safety device 20 depicted in FIGS. 3A and 3B is depicted in FIG. 4.

In the embodiment depicted in FIGS. 3A, 3B and 4, the outer circumferential periphery of the movable braking element 28 comprises six circular arc shaped sections 31, 32 having two different curvatures.

The outer circumferential periphery of the non-circular cross-section comprises in particular a first group of circular arc shaped sections 31 having a first curvature as defined by a first radius, and a second group of circular arc shaped sections 32 having a second curvature as defined by a second radius, which differs from the first radius. The circular arc shaped sections 31, 32 of the first and second groups are arranged alternatingly along the outer circumferential periphery of the movable braking element 28. In other words, a circular arc shaped section 31 of the first group is arranged between two circular arc shaped sections 32 of the second group, and a circular arc shaped section 32 of the second group is arranged between two circular arc shaped sections 31 of the first group, respectively.

Figure 5:
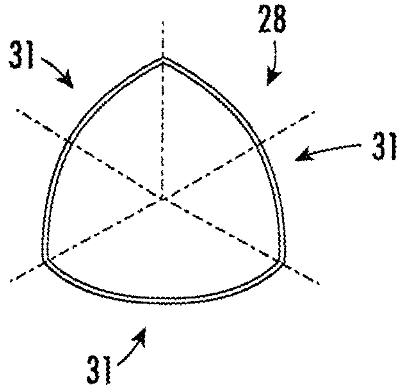
FIG. 5 depicts an example of a Reuleaux triangle.
Figure 6:
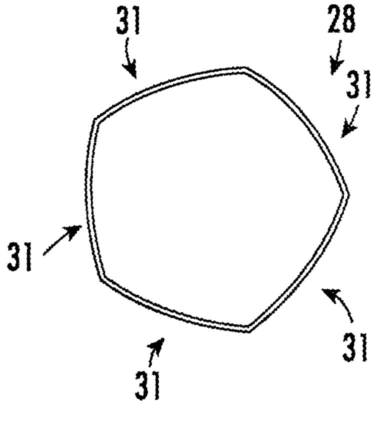
FIG. 6 depicts an example of a Reuleaux pentagon.

In further exemplary embodiments, the outer circumferential periphery of the non-circular cross-section of the movable braking element 28 may be a Reuleaux polygon, for example a Reuleaux triangle, as it is depicted in FIG. 5, or a Reuleaux pentagon, as it is depicted in FIG. 6.

The different non-circular cross-sections of the movable braking element 28 depicted in FIGS. 4 to 6 are, however, only shown as examples. The disclosure is in particular not restricted to the selection of cross-sections depicted in the figures. The non-circular cross-section of the movable braking element 28 may be any non-circular cross-section that defines a geometric shape having a constant width.

Figure 7A:
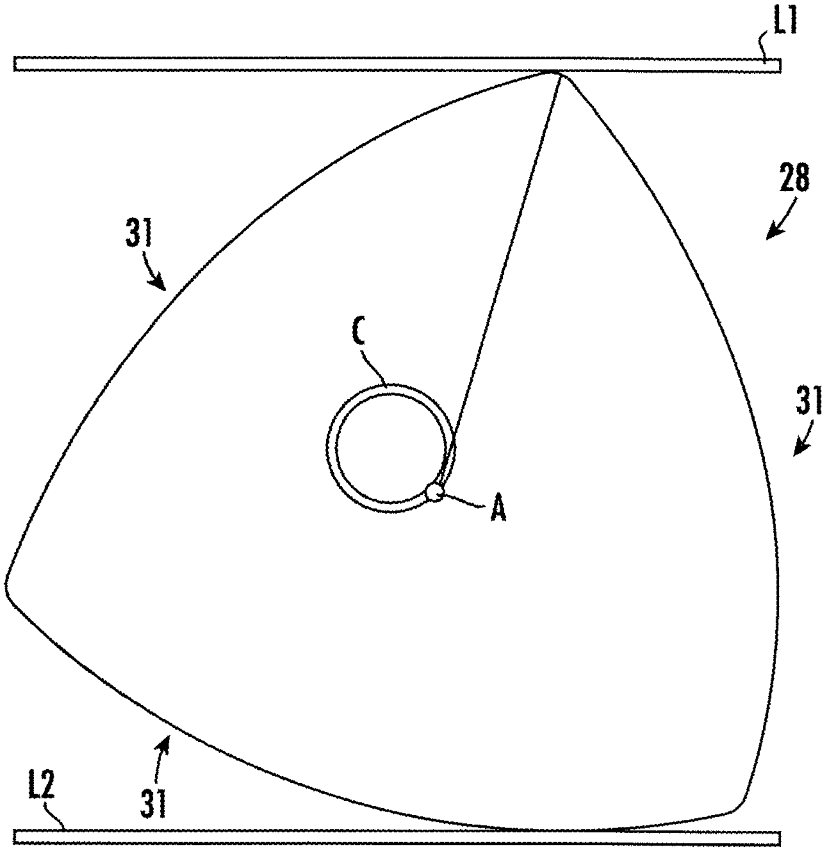
FIGS. 7A and 7B schematically illustrate the rotation of a movable braking element according to an exemplary embodiment of the disclosure between two parallel linear guides.
Figure 7B:
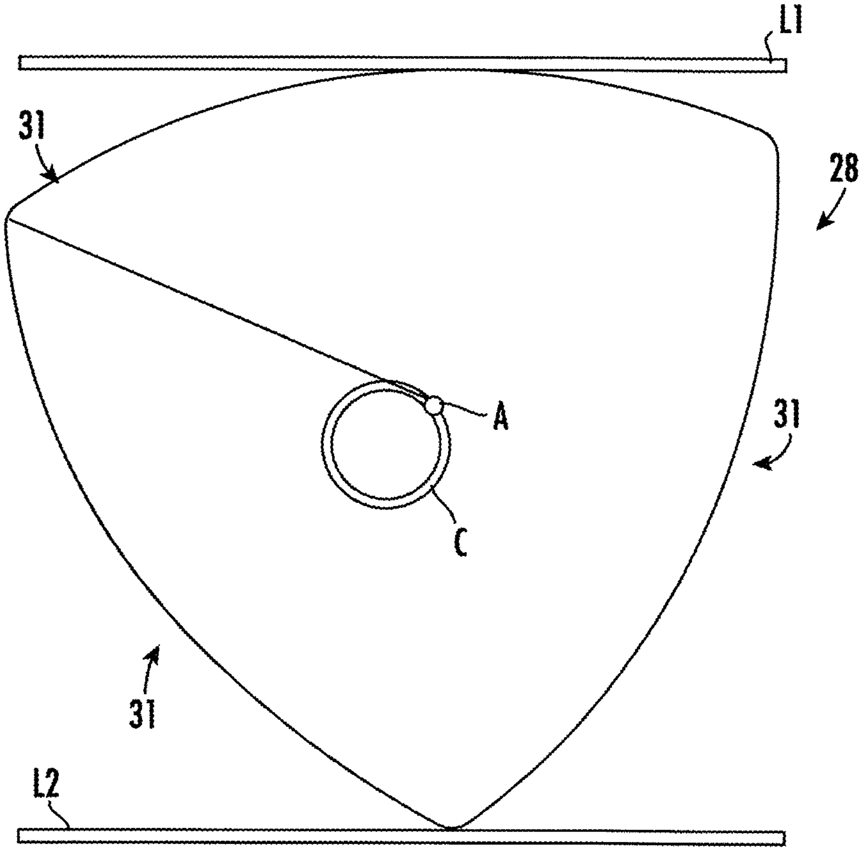

A movable braking element 28 having a non-circular cross-section with a constant width according to an exemplary embodiment of the disclosure is able to rotate between two parallel linear guides while continuously contacting the two parallel linear guides $L_1$, $L_2$. This is schematically illustrated for a movable braking element 28 having a non-circular cross-section, which has the contour of a Reuleaux triangle, in FIGS. 7A and 7B.

When the movable braking element 28 rotates between the two parallel guides $L_1$, $L_2$, the rotation axis A of the movable braking element 28 moves along the circle C.

Employing a movable braking element 28 having a non-circular cross-section according to exemplary embodiments of the disclosure allows increasing the radii of the circular arc shaped sections 31 of the outer circumferential periphery of the movable braking element 28, which are in contact with the brake shoe 26 and with the support element 30, when the movable braking element 28 moves rotatingly along the movable braking element 28 and the support element 30, without increasing the dimensions, in particular without increasing the diameter of the escribed circle, of the movable braking element 28.

Alternatively, the dimensions, in particular the diameter of the escribed circle, of the movable braking element 28 may be reduced without reducing the radii of the circular arc shaped sections 31 of the movable braking element 28, which are in contact with the brake shoe 26 and with the support element 30, when the movable braking element 28 moves rotatingly along the movable braking element 28 and the support element 30.

Figure 8:
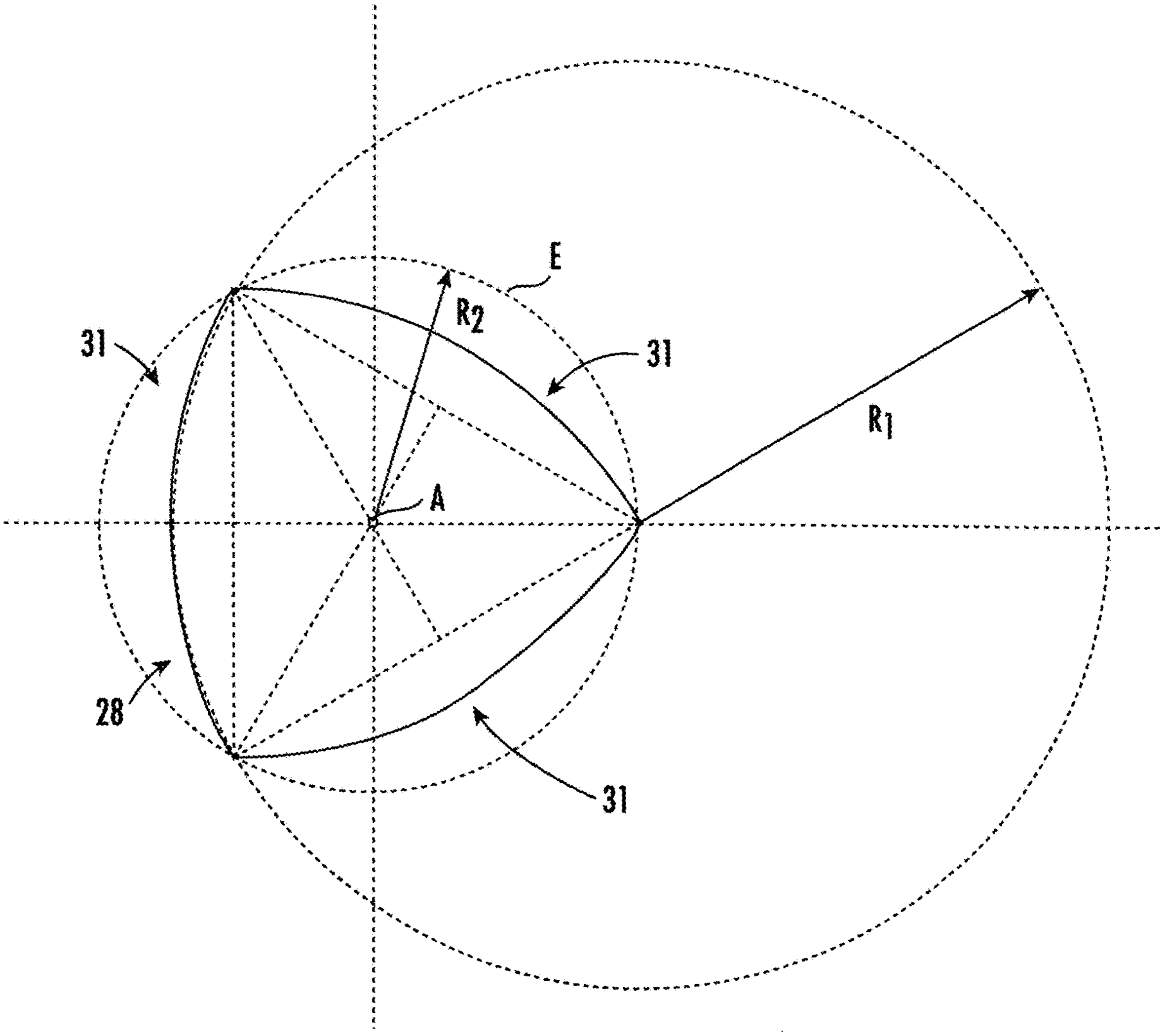
FIG. 8 depicts a schematic view of a movable braking element according to an exemplary embodiment of the disclosure.

FIG. 8 depicts a schematic view of a movable braking element 28 according to an exemplary embodiment of the disclosure. Similar to the movable braking element 28 depicted in FIGS. 7A and 7B, the movable braking element 28 depicted in FIG. 8 has a non-circular cross-section, which has the contour of a Reuleaux triangle.

The curvature of the curved sections 31, which are defined by the circular arc shaped sides of the Reuleaux triangle, may, for example, have a first radius $R_1$ of 21.65 mm.

When rotatably moving along the guide member 14, 15 and along the support element 30, with the circular arc shaped sections 31 contacting the guide member 14, 15 and the support element 30, the movable braking element 28 unrolls along the guide member 14, 15 and the support element 30 as if it would be a (fictitious) circular roller having the first radius $R_1$. The first radius $R_1$ of the circular arc shaped sections 31 of the first group may therefore be denoted as an effective radius $R_{eff}$ of the movable braking element 28.

Despite have a relatively large effective radius $R_{eff}$ of 21.65 mm, a movable braking element 28 according to an exemplary embodiment of the disclosure fits into an enveloping circle E having a much smaller second radius $R_2$, namely a second radius $R_2$ of 12.50 mm. In other words, in comparison to a (fictitious) circular braking element having a circular cross-section with an effective radius $R_{eff}$ of $R_1$=21.65 mm, the movable braking element 28 depicted in FIG. 8 has considerably smaller dimensions.

The first and second radii $R_1$ and $R_2$ mentioned before are only provided as examples. The first and second radii $R_1$ and $R_2$ of a movable braking element 28 according to an exemplary embodiment may be set according to the respective needs, in particular the maximum braking forces, which are needed for reliably braking the elevator car 6 and/or the elevator counterweight 21, and according to the space, which is available within the elevator safety device 20.

Increasing the effective radius Re of the circular arc shaped sections 31 of the movable braking element 28, which contact the guide member 14, 15 and the support element 30, respectively, enables the elevator safety device 20 to reliably brake elevator cars 6 and/or elevator counterweights 21 having more weight and/or moving with larger speeds.

A movable braking element 28 according to an exemplary embodiment of the disclosure allows for achieving these advantages, which result from increasing the effective radius $R_{eff}$ of the curvature of the circular arc shaped sections 31 of the movable braking element 28, without increasing the overall dimensions of the movable braking element 28.

Alternatively, the dimensions, in particular the diameter, of the movable braking element 28 may be reduced without reducing the braking capacity of the movable braking element 28.

Increasing the effective radius Ref defining the curvature of the circular arc shaped sections 31 of the movable braking element 28 further allows for reducing potential damage of the guide member 14, 15, which may be caused by the engagement of the movable braking element 28 with the guide member 14, 15.

The dimensions of the functional components of the safety device 20, in particular the dimensions of the movable braking element 28 and of the support element 30, may be set so that not more than a single circular arc shaped section 31 of the outer circumferential periphery of the movable braking element 28 unrolls along the guide member 14, 15 and along the support element 30, respectively, before the elevator car 6 or the elevator counterweight 21 comes to a complete stop.

In a further embodiment, the movable braking element 28 may be configured so that more than a single circular arc shaped section 31 of the outer circumferential periphery of the movable braking element 28 unrolls along the guide member 14, 15 and along the support element 30, before the elevator car 6 or the elevator counterweight 21 comes to a complete stop.

An example of an elevator safety device 20 according to such an embodiment is depicted in FIG. 9. In the exemplary embodiment depicted in FIG. 9, the cross-section of the movable braking element 28 has the shape of a Reuleaux pentagon, as it is depicted in FIG. 6.

Instead of an elongated support element 30, as it is depicted in FIGS. 3A and 3B, the elevator safety device 20 depicted in FIG. 9 comprises a support element 30 having two support surfaces 38*a*, 38*b*. The two support surfaces 38*a*, 38*b* are arranged adjacent to each other forming a continuous support surface.

The two support surfaces 38*a*, 38*b* are oriented in different angles with respect to the guide member 14, 15 and the opposing brake shoe 26.

In the embodiment depicted in FIG. 9, the elevator safety device 20 is configured such that a first circular arc shaped section 31 of the outer circumferential periphery of the movable braking element 28 unrolls along the first support surface 38*a*, when the movable braking element 28 starts to unroll along the support element 30, and that a second circular arc shaped section 32 of the outer circumferential periphery of the movable braking element 28 unrolls along the second support surface 38*b*, after the movable braking element 28 has reached and passed the end of the first support surface 38*a* adjacent to the second support surface 38*b*.

In a configuration, as it is depicted in FIG. 9, in which the inclination angle of the first support surface 38*a* with respect to the guide member 14, 15 is smaller than the inclination angle of the second support surface 38*b*, the larger inclination angle of the second support surface 38*b* causes the second support surface 38*b* to act as a stopper, stopping the movement of the movable braking element 28.

In an alternative configuration, which is not explicitly shown in the figures, the inclination angle of the first support surface 38*a* with respect to the guide member 14, 15 may be larger than the inclination angle of the second support surface 38*b*. Such a configuration of the first and second support surfaces 38*a*, 38*b* may result in an increased horizontal movement of the movable braking element 28 prior to engagement. This may allow reducing the total length of the support element 30 and, in consequence, the height of the elevator safety device 20.

In further embodiments, which are not explicitly shown in the figures, the movable braking element 28 may comprise more than two support surfaces 38*a*, 38*b* allowing each of three or more circular arc shaped sections 31, 32 of the outer circumferential periphery of the movable braking element 28 to unroll along a different support surface 38*a*, 34*b*, respectively, when the movable braking element 28 moves rotatingly from its standby position into its activated position.

The three or more circular arc shaped sections 31, 32 may be oriented in different angles with respect to the guide member 14, 15 and the opposing brake shoe 26.

While the disclosure has been described with reference to exemplary embodiments, it will be understood by those skilled in the art that various changes may be made and equivalents may be substituted for elements thereof without departing from the scope of the disclosure. In addition many modifications may be made to adopt a particular situation or material to the teachings of the disclosure without departing from the essential scope thereof. Therefore, it is intended that the disclosure shall not be limited to the particular embodiment disclosed, but that the disclosure includes all embodiments falling within the scope of the dependent claims.

REFERENCES

2 elevator system
3 tension member
4 hoistway
5 elevator drive
6 elevator car
7*a* control panels
7*b* control panel
8 landing
9 elevator system controller
11 landing door
12 car door
14 guide member
15 guide member
20 safety device
21 counterweight
22 housing
24*a* first opening
24*b* second opening
25 passage
26 brake shoe
28 braking element
30 support element
30*a* first end of the support element
30*b* second end of the support element
31 first circular arc shaped section
33 leaf spring
32 second circular arc shaped section
34*a* first fixture
34*b* second fixture
36 stopper
38*a* first support surface
38*b* second support surface
62 car roof
64 car floor
66 side wall
68 interior space
70 carrying passengers

The invention claimed is:

1. An elevator safety device comprising:

a housing attachable to an elevator car or to an elevator counterweight of an elevator system, the housing comprising a passage for allowing a guide member to pass through;

a brake shoe attached to the housing and located on a first side of the guide member passing through the passage;

a support element arranged on a second of side of the guide member passing through the passage, the support element extending at an angle with respect to the guide member, thereby defining a tapered region between the guide member and the support element; and a movable braking element, which is rotatable around a rotation axis of the movable braking element;

wherein the movable braking element is, at least in an activated condition of the elevator safety device, arranged within said tapered region defined by the support element and the guide member, the movable braking element is rotatingly movable along the support element into a wedged condition between the support element and the guide member;

wherein the movable braking element has, in a plane that is oriented perpendicularly to the rotation axis, a non-circular cross-section, which is defined by a closed curve having a constant width.

2. The elevator safety device according to claim 1, wherein the rotation axis of the movable braking element is moving along a circumference of a circle when the movable braking element rotates around the rotation axis.

3. The elevator safety device according to claim 1, wherein the non-circular cross-section comprises a plurality of circular arc shaped sections, each of said circular arc shaped sections having a same curvature as defined by a radius of the circular arc.

4. The elevator safety device according to claim 1, wherein the non-circular cross-section of the movable braking element has a shape of a Reuleaux polygon.

5. The elevator safety device according to claim 4, wherein the Reuleaux polygon has a shape of a Reuleaux triangle or of a Reuleaux pentagon.

6. The elevator safety device according to claim 1, wherein a circumferential periphery of the movable braking element comprises a plurality of circular arc shaped sections having at least two different curvatures as defined by a respective radius of each of the circular arc shaped sections.

7. The elevator safety device according to claim 6, wherein the circumferential periphery of the movable braking element comprises a first group of circular arc shaped sections having a first curvature as defined by a first radius, and a second group of circular arc shaped sections having a second curvature as defined by a second radius, which differs from the first radius; wherein the circular arc shaped sections of the first group and the circular arc shaped sections of the second group are arranged alternately along the circumferential periphery of the movable braking element.

8. The elevator safety device according to claim 7, wherein the circular arc shaped sections of the first group have a first length along the circumferential periphery of the movable braking element, and wherein the circular arc shaped sections of the second group have a second length along the circumferential periphery of the movable braking element, which differs from the first length.

9. The elevator safety device according to claim 6, wherein the circumferential periphery of the movable braking element comprises six circular arc shaped sections.

10. The elevator safety device according to claim 1, wherein the support element is stiff.

11. The elevator safety device according to claim 1, wherein the support element is elastic.

12. The elevator safety device according to claim 11, wherein the support element comprises a spring assembly.

13. The elevator safety device according to claim 12, wherein the spring assembly comprises a leaf spring or a stack formed of a plurality of leaf springs.

14. The elevator safety device according to claim 11, wherein the support element is elastic in a direction that is oriented perpendicularly to a longitudinal direction of the support element and the rotation axis of the movable braking element.

15. The elevator safety device according to claim 1, comprising at least one stopper, which is configured for stopping a movement of the movable braking element along the support element.

16. The elevator safety device according to claim 15, wherein the at least one stopper is provided by and/or formed integrally with a portion of the housing.

17. A method of activating an elevator safety device according to claim 1, wherein the method includes moving the movable braking element into a position, in which the movable braking element is in contact with the guide member, resulting in frictional engagement between the movable braking element and the guide member, so that the movable braking element is moved, due to the frictional engagement with the guide member, into a wedged condition between the support element and the guide member, when the elevator safety device moves along the guide member.

18. An elevator car or elevator counterweight comprising:

at least one elevator safety device comprising:

a housing attachable to an elevator car or to an elevator counterweight of an elevator system, the housing comprising a passage for allowing a guide member to pass through;

a brake shoe attached to the housing and located on a first side of the guide member passing through the passage;

a support element arranged on a second of side of the guide member passing through the passage, the support element extending at an angle with respect to the guide member, thereby defining a tapered region between the guide member and the support element; and a movable braking element, which is rotatable around a rotation axis of the movable braking element;

wherein the movable braking element is, at least in an activated condition of the at least one elevator safety device, arranged within said tapered region defined by the support element and the guide member, the movable braking element being capable of rotatingly moving along the support element into a wedged condition between the support element and the guide member;

wherein the movable braking element has, in a plane that is oriented perpendicularly to the rotation axis, a non-circular cross-section, which is defined by a closed curve having a constant width.

19. The elevator car or elevator counterweight according to claim 18, wherein:

the at least one elevator safety device comprises a first elevator safety device and a second elevator safety device;

wherein, for the first elevator safety device, a first end of the support element is a lower end of the support element facing towards a floor of a hoistway, and a second end of the support element, which is arranged closer to the guide member than the first end, is an upper end of the support element facing towards an upper end of the hoistway; and wherein, for the second elevator safety device, the first end of the support element is an upper end of the support element facing towards an upper end of the hoistway, and the second end of the support element which is arranged closer to the guide member than the first end, is a lower end of the support element facing towards the floor of the hoistway.

20. An elevator system comprising:

an elevator car, which is movable along a guide member between a plurality of landings; and wherein the elevator car is an elevator car according to claim 18.

21. The elevator system according to claim 20 further comprising an elevator counterweight, which is configured for moving concurrently and in an opposite direction with respect to the elevator car.

* * * * *